United States Patent [19]

Messina et al.

[11] 4,332,010
[45] May 25, 1982

[54] CACHE SYNONYM DETECTION AND HANDLING MECHANISM

[75] Inventors: Benedicto U. Messina, Poughkeepsie; William D. Silkman, Hopewell Junction, both of N.Y.

[73] Assignee: International Business Machines Corporation, Armonk, N.Y.

[21] Appl. No.: 130,946

[22] Filed: Mar. 17, 1980

[51] Int. Cl.³ .......................... G06F 9/36; G06F 13/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,902,164 | 8/1975 | Kelley et al. | 364/200 |
| 4,084,230 | 4/1978 | Matick | 364/200 |
| 4,145,738 | 3/1979 | Inoue et al. | 364/200 |
| 4,218,743 | 8/1980 | Hoffman et al. | 364/200 |
| 4,264,953 | 4/1981 | Douglas et al. | 364/200 |

*Primary Examiner*—Harvey E. Springborn
*Attorney, Agent, or Firm*—Bernard M. Goldman

[57] ABSTRACT

A fast synonym detection and handling mechanism is disclosed for a cache directory utilizing virtual addressing in data processing systems. The cache directory is divided into $2^N$ groups of classes, in which N is the number of cache address bits derived from a translatable part of a requested logical address. The cache address is derived from a non-translatable part of the logical address which is used to simultaneously select one class in each of the $2^N$ groups. The selected class entries are simultaneously compared with one or more dynamic lookaside address translator (DLAT) translated absolute addresses. Compare signals, one for each class entry per DLAT absolute address, are routed to a synonym detection circuit. The detection circuit simultaneously interprets all directory compare signals and determines if a principle hit, synonym hit or a miss occurred in the cache for each request. A principle hit occurs in the group selected by the translatable part of the requested address, and a synonym hit occurs in one of the other groups. If a synonym hit is detected, the group identifier bits for the group having the hit are concatenated with the non-translatable bits used as the cache address for locating the required cache data. For a set-associative cache, set identifier bits are simultaneously generated for cache addressing.

20 Claims, 18 Drawing Figures

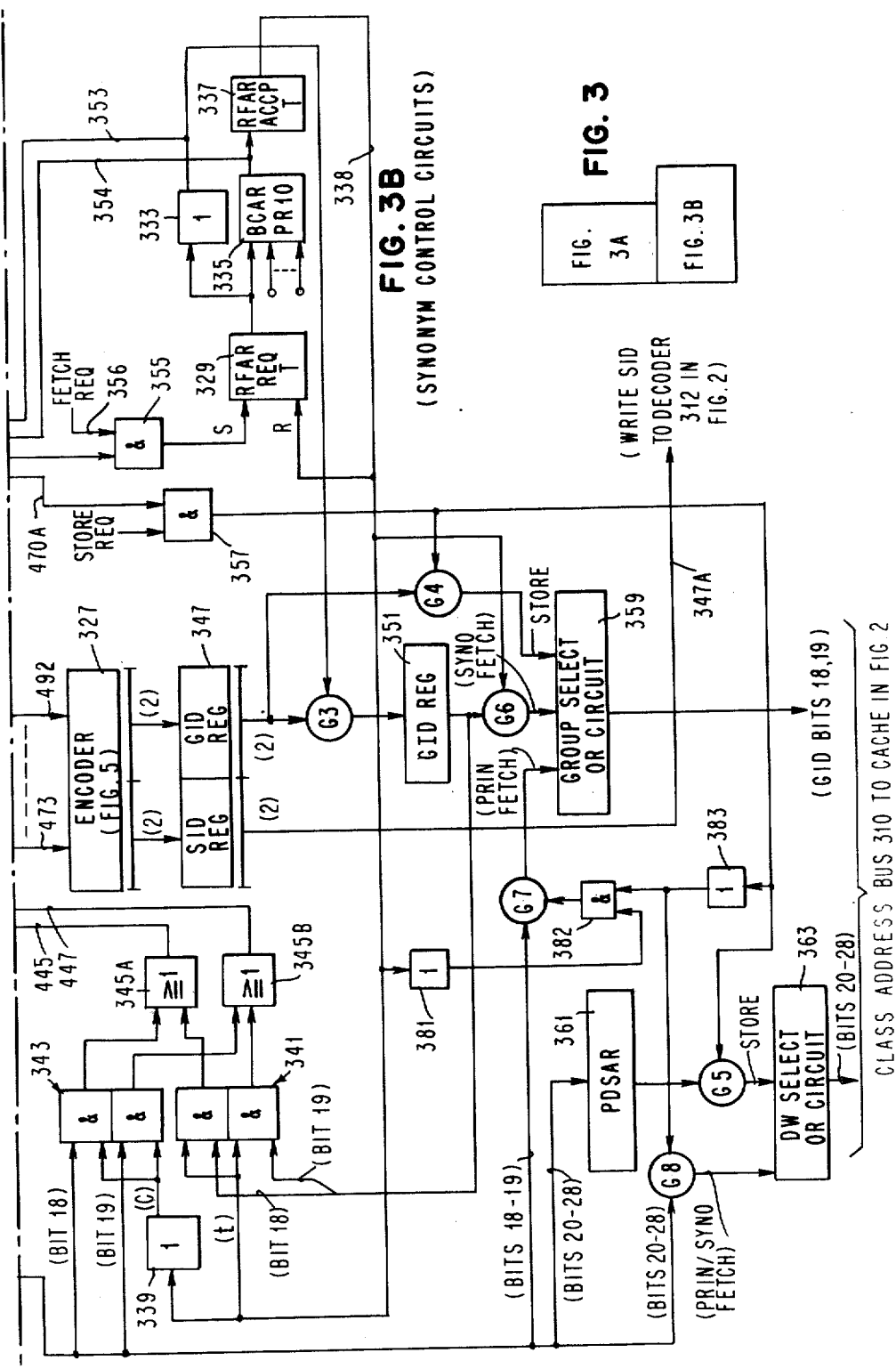

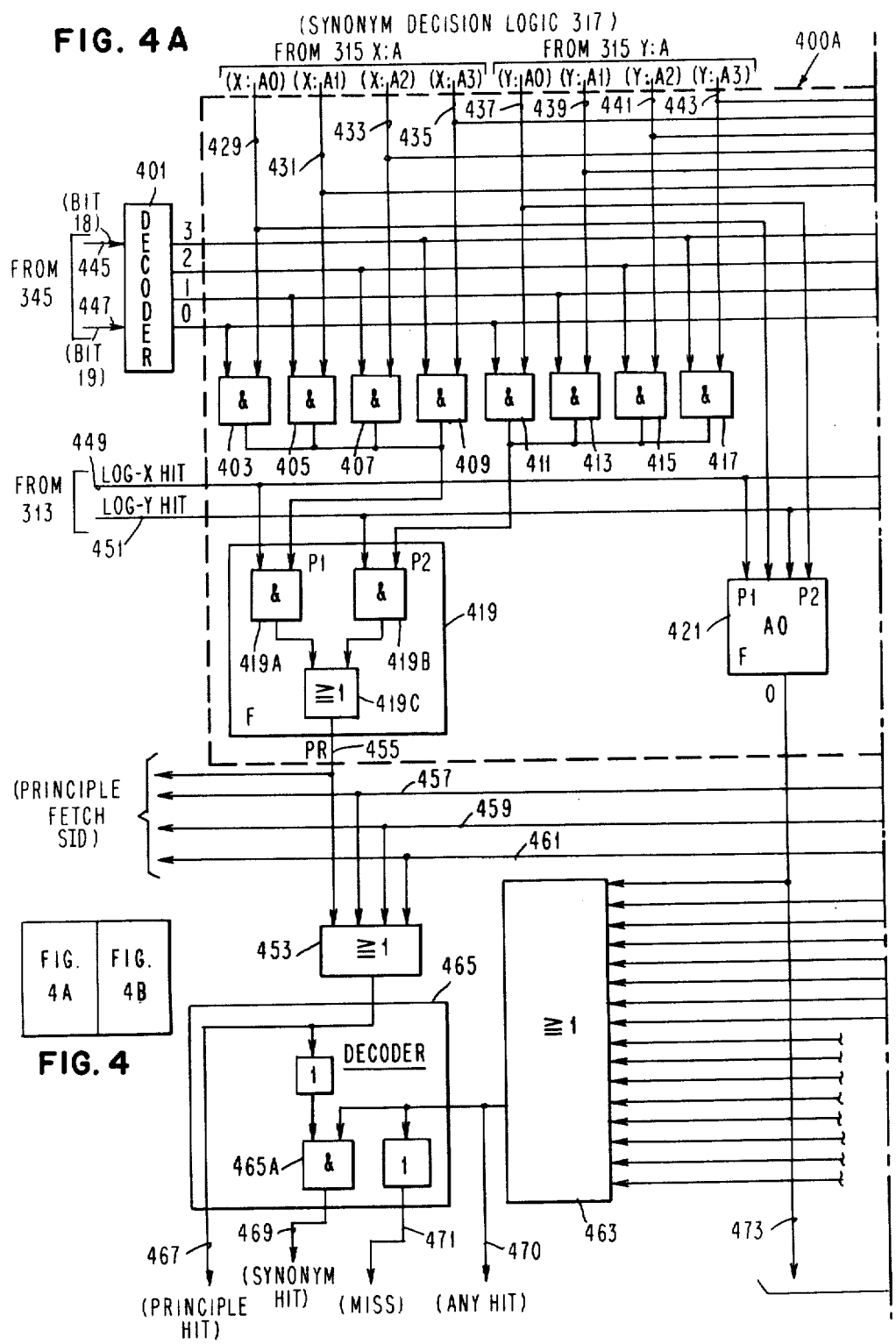

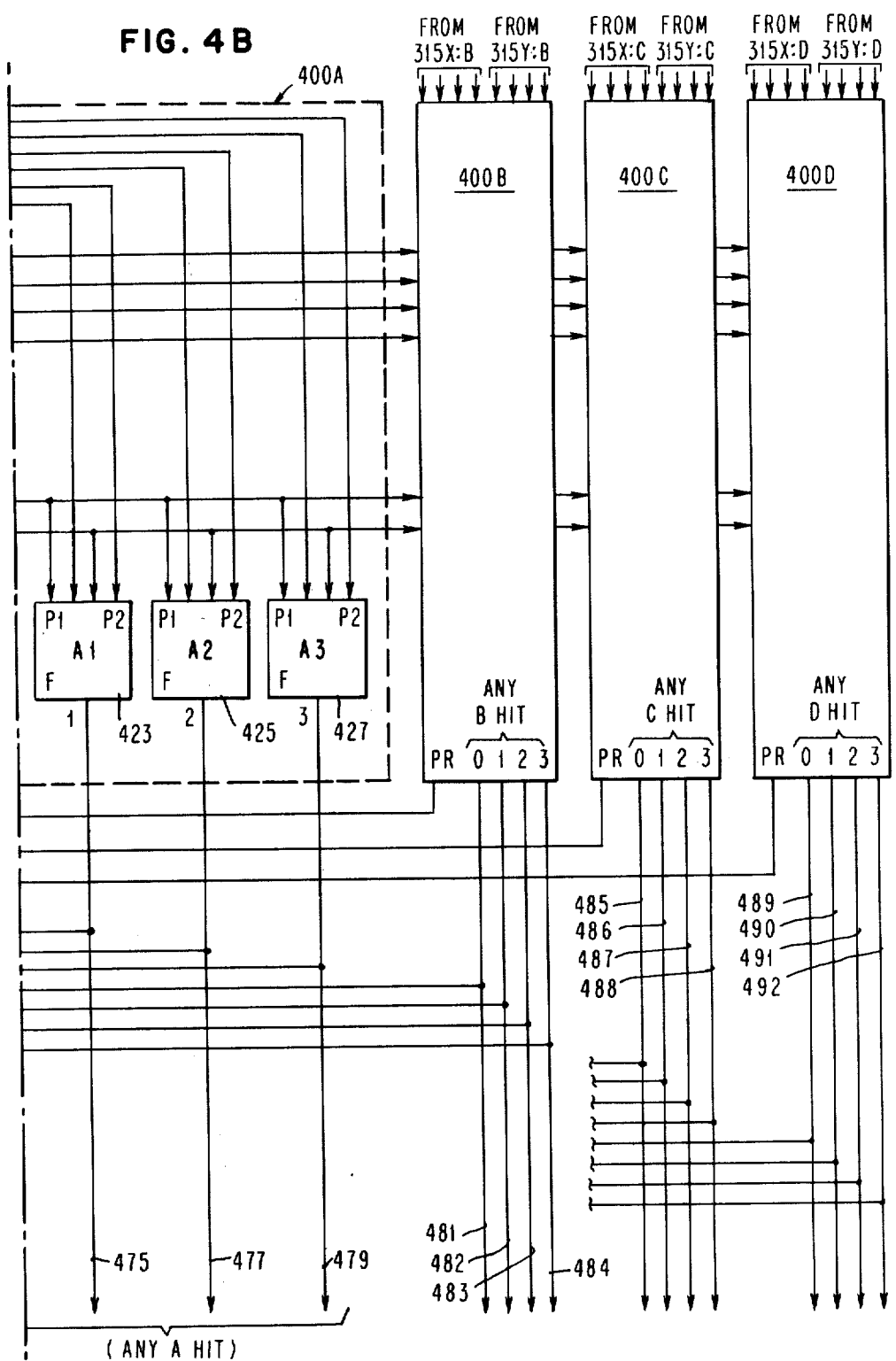

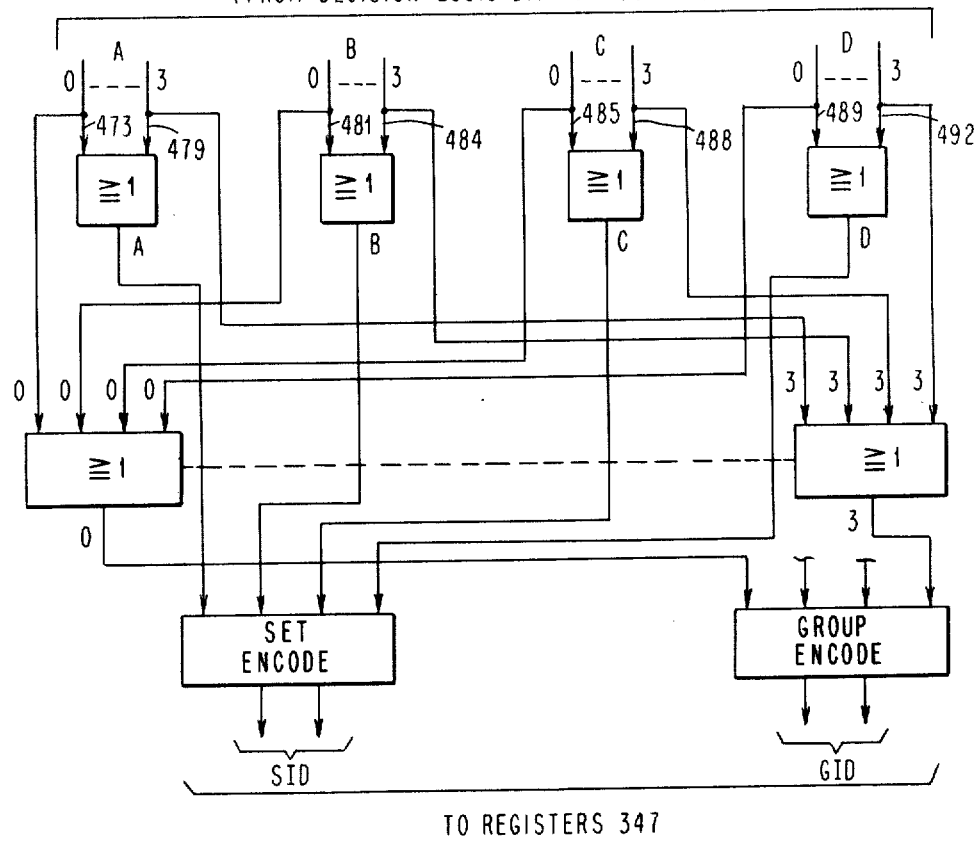
FIG. 5 (ENCODER 327)
(FROM DECISION LOGIC 317 IN FIGS. 4A & 4B)
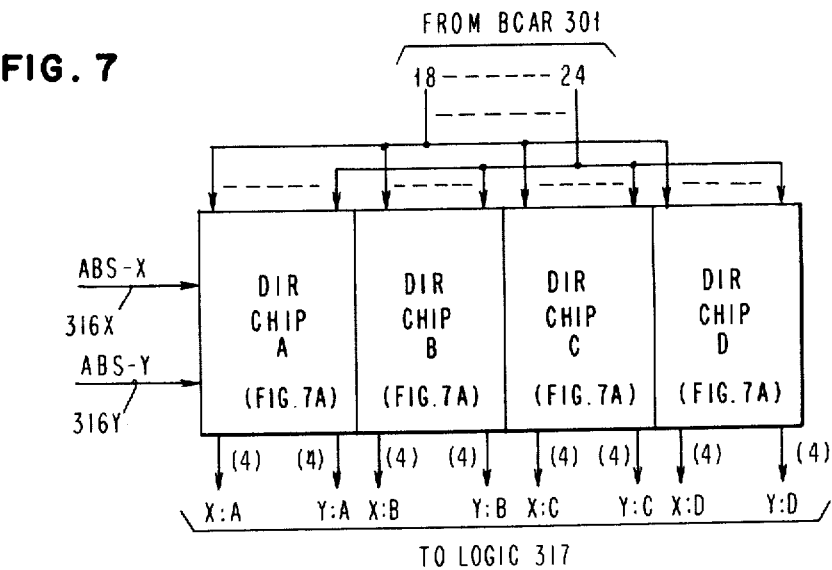
FIG. 7

FIG. 6A

| IE | BCE | BCE |
|---|---|---|
| (FETCH REQUEST) | (BCAR BUSY) (DLAT CMPR) (DIRECTORY CMPR) (SYNONYM DETECT) | (RFAR LOADED) (RFAR BUSY) (FETCH DELAYED) |
| R | C1 | C2/DLY |

| BCE | BCE | BCE |
|---|---|---|
| (RFAR BUSY & BCAR REQUEST) (ADV SIGNAL TO IE) | (BCAR BUSY) (DLAT CMPR) (DIRECTORY CMPR) (PRINCIPLE HIT BY SYNONYM (SUBSTITUTE GID BITS 18,19) | (SYNONYM DATA TO REQUESTOR) |
| DLY | C1 | C2 |

FIG. 6B

| EE | BCE | BCE |
|---|---|---|
| (STORE REQUEST) | (BCAR BUSY) (DLAT CMPR) (DIRECTORY CMPR) | (PDSAR LOADED) (ANY HIT TRIG) (WRITE CACHE) |
| R | C1 | C2 |

(ONE CHIP HAVING ONE DIRECTORY SET WITH COMPARE LOGIC)

| EE | BCE | BCE | BCE |
|---|---|---|---|
| (REQUEST FETCH) | (BCAR BUSY) (DLAT CMPR) (DIRECTORY CMPR) (SYNONYM DETECT) | (PDAR LOAD) (ANY HIT TRIG) (GATE FETCH SID) (ADDRESS CACHE) | (SYNONYM DATA TO REQUESTOR) |
| R | C1 | C2 | C3 |

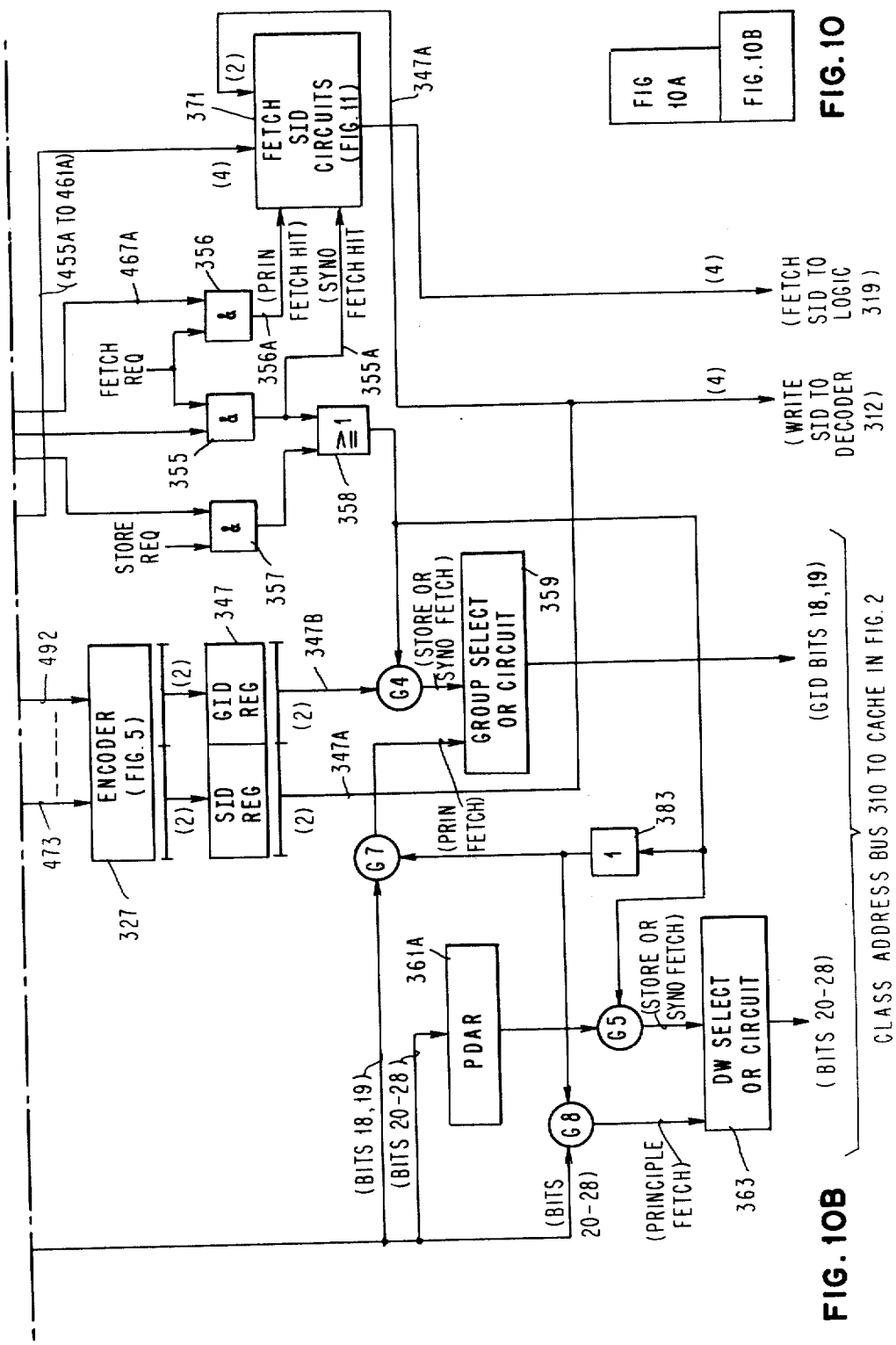

CACHE SYNONYM DETECTION AND HANDLING MECHANISM

BACKGROUND OF THE INVENTION

1. Field of the Invention

This invention relates generally to the field of digital computers and more particularly to the area of memory control within a computer. More specifically it relates to a synonym detection and handling mechanism for caches in a virtual storage system.

2. Description of the Prior Art

In a data processing system with a storage hierarchy, selected lines of data in a main storage are copied in a local high speed buffer, often called a cache, for fast access by a CPU. Whenever the processor requests new data, the system first checks the cache to determine whether the data is available in the cache; and if it is, the data is quickly provided to the processor. If the data is not available in the cache, the data is retrieved more slowly from the main memory.

Caches in current systems are typically based on the concept of "set associativity", wherein a CPU requestor directly addresses a cache directory slot (called a class) having several entries and associatively searches all entries in one class in parallel to determine if the addressed class has an address matching the request address. A set-associative cache is a compromise between a fully associative cache, in which any block of main storage may map into any position in the cache, and a directly addressed cache, where each main storage address can map into only one location in the cache. Fully associative caches have the liability of lengthy directory search time and an elaborate replacement (LRU) mechanism. Non-associatively addressed caches are the simplest to implement in terms of hardware, but yield significantly lower performance than the other two schemes due to increased overwriting of entries.

As the size of the preferred set-associative cache increases, either (1) the address range used to access the cache increases, or (2) the degree of set-associativity must be increased, or (3) both the set-associativity and address range are increased. An increase in the set associativity, however, takes either extra time or excessive hardware to examine all sets in the addressed class. Also, available IC packaging technology for cache directories does not lend itself a substantial increase in set associativity. Accordingly, cost constraints prefer that the cache directory size be increased by increasing the directory address range (i.e. number of classes). However, as the number of classes in the cache directory is increased, eventually the directory address bits taken from a requesting virtual address must expand past the high-order end of its non-translatable field (i.e. the D field) of the virtual address and into the translatable field (i.e. PX field) of the virtual address. The so-called cache synonym problem occurs when the cache address uses bits from the translatable field of the logical address. A cache synonym exists when the data required by a requesting logical address is available in a cache class different from the class addressed by the request. Synonyms may for example be caused by (1) requests which switch between virtual and real addresses for the same data, or (2) by one user addressing a line of data with one virtual address and another user addressing the same line with a different virtual address which locates a different class in the cache.

U.S. Pat. No. 3,723,976 to J. A. Alvarez at al, issued Mar. 27, 1973 and assigned to the assignee of the present application, shows a memory system with logical and real addressing in a multi-processing environment. Each processor has associated with it a cache. Means are provided for the cache to retain a modified copy of data. The contents of the cache may be accessed by a logical address, i.e. either a real or virtual address. A dynamic address translation directory (i.e. DLAT) contains translated logical addresses. A cache fetch directory is provided to keep track of the data in the cache. The cache fetch directory entries are addressed by bits from both translatable and non-translatable portions of the desired data address. Means are provided to insure that only one copy of data is maintained in the cache although it may be entered at any of several cache locations (i.e. principle or synonym location) dependent upon whether the virtual or real address last accessed the data. A cache hit/miss detection mechanism is such that when cross indexing is established for a new line being fetched, some lines in the cache will lose index pointers. They are marked invalid and they are cast out if changed. A synonym entry causes a miss and is therefore invalidated and may be cast out. If a synonym entry is the target of the current request, its miss causes it to be refetched from main storage and written back into the currently addressed partition (i.e. principle class) in the cache directory. The effect is to move a synonym to the principle class with a great loss in access time. The cache hit/miss detection mechanism described therein does not distinguish between a cache miss (where the requested data is not found in the cache), and a synonym hit (where the requested data is available in the cache at another location).

It has been proposed to perform synonym detection in a copy of a processor cache directory. This proposal also treats a synonym as a cache miss in the main directory. Synonym detection in the copy directory begins one or more cycles after the cache miss is first detected in the main directory. An additional cycle is taken in the copy directory for serially accessing each class which could possibly contain a synonym, e.g. three additional cycles for checking three classes which might contain a synonym line address. Such copy directory may also be used for other purposes, e.g. cross-interrogation of a request by another processor.

U.S. Pat. No. 3,761,881 to Anderson et al, issued Sept. 25, 1978 and assigned to the assignee of the present application, shows a translation storage scheme for virtual memory system. Both a main storage and a cache are real-address oriented. Current virtual-to-real address translations are retained in a translation lookaside table (TLAT), which is also sometimes called a DLAT. The cache directory uses real addresses to represent the data in the cache. Each CPU-provided virtual address accesses a class in the TLAT and a class in the cache directory. A virtual address stored in the accessed TLAT class is compared to the CPU virtual address. Also the translated real address in the accessed TLAT class is compared to each real address in the accessed cache directory class. If both the virtual and real address comparisons are equal, the data is accessed from a corresponding location in the cache.

U.S. Pat. No. 4,136,385 to Gannon et al, issued Jan. 23, 1979 and assigned to the assignee of the present application, shows a control means for handling common-segment DLAT synonyms. (The DLAT synonym problem is not related to the cache synonym problem.)

The DLAT synonym control means in this patent is used with multiple virtual storage systems in which a common page has the same virtual address in plural address spaces. The control means eliminates plural entries for a common page in a translation lookaside buffer (DLAT) by providing a common indicator in each DLAT entry containing a common page address to eliminate associating the entry with any particular address space.

IBM Maintenance Library, "3033 Processor Complex, Theory of Operation/Diagram Manual" Volume 4, Processor Storage Control Function (PSCF) and Processor Storage, Form SY22-7004-0, pages 1.6.1 and 1.6.2 show and describe a large high speed buffer concept, in which a sixteen-way set associative cache is used to avoid the synonym problem by avoiding the use of any translatable bits of the processor request address in the cache directory address.

SUMMARY OF THE INVENTION

It is an object of the present invention to provide a fast synonym detection mechanism.

It is a further object of this invention to provide a novel feature in a cache directory called a synonym hit, which operates in addition to the conventional cache functions of a principle hit or miss.

It is a further object of this invention to provide the novel feature of a synonym hit which accesses the synonym data from the cache without requiring any access to main storage.

It is another object of the present invention to provide a synonym detection and handling mechanism to support a large cache without requiring a high degree of associativity, for example to be able to increase the number of cache classes while using 4-way set associativity to support a cache directory size previously obtained with a 16-way set associative cache that avoided synonyms but which requires many more compare circuits and may require longer access time due to the greater associativity.

It is still another object of this invention to provide a design for a semiconductor chip which is replicated for each set in a plural-set cache directory; and each chip supports plural groups of classes and compare logic for its related set for enabling detection of a synonym or principle hit or a miss in the related set in the cache during one directory access cycle.

One of the important features of the present invention is to obtain synonym detection within the same machine cycle in which a cache hit or miss is determined. That is, synonym detection may be done in the same cycle in which both the DLAT and cache directories are accessed and in which compare operations detect a cache hit or miss. If a synonym hit is found, processing of the synonym may be done within the next two cycles after which the synonym entry is accessed as if it were a principle cache entry.

In the prior art system such as that disclosed in the above-mentioned U.S. Pat. No. 3,723,976, no synonym hit is recognized and a synonym is treated as a cache miss which involves many machine cycles while a line is cast out and then refetched into the cache. In another proposal using a copy of the cache directory for synonym detection, the synonym detection in the copy directory occurs in response to a cache miss one or more cycles following the cache miss detection in the principle cache directory.

This invention constructs a cache directory in a novel manner by dividing the directory classes into $2^N$ groups, in which N is the number of translatable bits in the cache directory address for locating any class in the directory. The translatable bits comprise N bits justified from the low-order boundary of the page translatable part of each requesting logical address to the cache. Each of the $2^N$ groups of directory classes has the potential for containing either a principle cache hit, a synonym hit, or a cache miss. A cache miss exists when no principle or synonym cache hit is found for a request. The cache directory classes may also be constructed with or without set associativity, i.e. set associativity is not required with this invention but the invention operates well in a set associative cache directory. The class grouping in the cache directory is orthogonal to any set associativity groupings found in the cache directory. Furthermore, this invention provides an LSI chip arrangement for the cache directory in which each chip contains a part of all $2^N$ groups of classes, and contains compare hardware for simultaneously comparing lookaside page-translated absolute addresses with the absolute addresses in all addressed classes in the $2^N$ groups in the cache directory to require relatively few input/output connections on each chip, when compared to prior cache directory hardware structures.

The invention has each request simultaneously address the $2^N$ different classes in the cache directory, including one class in each of the $2^N$ groups. DLAT absolute address comparisons are performed simultaneously on all valid entries in the selected $2^N$ classes. The use of the high-order N translatable bits in the cache address are concurrently used to test one of the selected $2^N$ classes for a principle hit. At the same time, all of these $2^N$ classes are tested for any hit in each of these classes. A synonym hit is determined by detecting that any hit signal is active while the principle hit signal is (i.e. there was no principle hit) inactive. Then the detected one of the $2^N$ groups which has an any hit signal with no principle hit signal determines the group having the synonym hit. The one of the $2^N$ groups detected to have a synonym hit then is decoded into its N group identifying bits, which are then provided to the cache along with the untranslated bits (from the D field) of the request address to fetch or store the required unit of data in the cache.

BRIEF DESCRIPTION OF THE DRAWINGS

FIG. 3 shows how FIGS. 3A and 3B are arranged to make a complete drawing. FIGS. 3A and 3B, when arranged as shown in FIG. 3, illustrate a cache addressing system having a synonym detection mechanism in accordance with a preferred embodiment of the present invention.

FIG. 4 shows how FIGS. 4A and 4B are arranged to make a complete drawing. FIGS. 4A and 4B show a detailed implementation of the synonym decision logic 317 shown as a block in FIG. 3A.

FIG. 5 shows a detailed implementation of encoder 327 shown in FIG. 3B.

FIG. 6A illustrates the machine cycle timing for a cache fetch operation having a synonym hit in accordance with the teaching of the present invention.

FIG. 6B illustrates the machine cycle timing for a cache store operation having a synonym or principle hit.

FIG. 7 illustrates how four chips of the type shown in FIG. 8 may be combined to provide a cache directory which is four-way set associative and has four groups of classes.

FIGS. 10, 10A and 10B show a detailed implementation for the second embodiment.

DETAILED DESCRIPTION OF A PREFERRED EMBODIMENT

Figure 1:
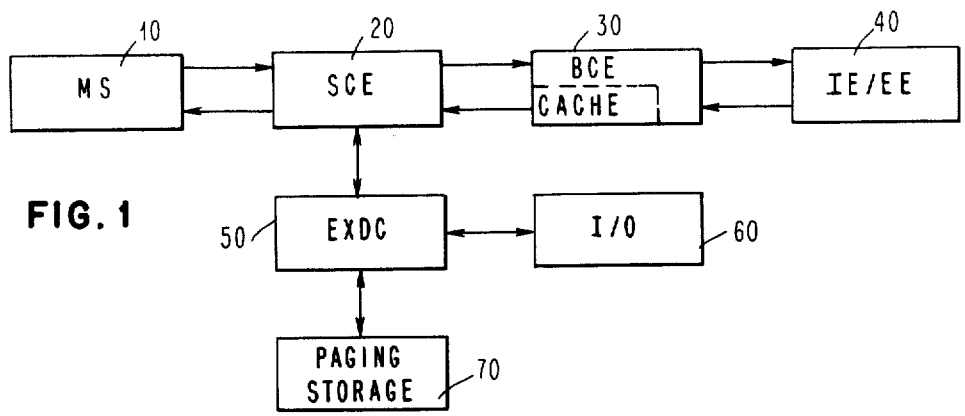
FIG. 1 shows a block diagram of a data processing system in which the present invention is embodied.

Referring to FIG. 1, a data processing system in which the present invention is embodied is shown in block diagram form. The data processing system typically comprises a main storage (MS) 10, a storage control element (SCE) 20, a buffer control element (BCE) 30 which includes a high speed buffer or cache 311, a processor comprised of an instruction element/execution element (IE/EE) 40, an external data controller (EXDC) 50 (which may be a conventional channel processor), I/O control units and devices 60, and a paging storage 70 (which may be a conventional bulk storage device). The IE/EE fetches or stores data in the cache 311 under the control of the BCE 30, and if the requested data is not available in the cache 311, the data is fetched from the MS 10 under the control of the SCE 20. The SCE can also transfer data between MS 10 and the I/O 60 or the paging storage 70 via the EXDC 50.

Figure 2:
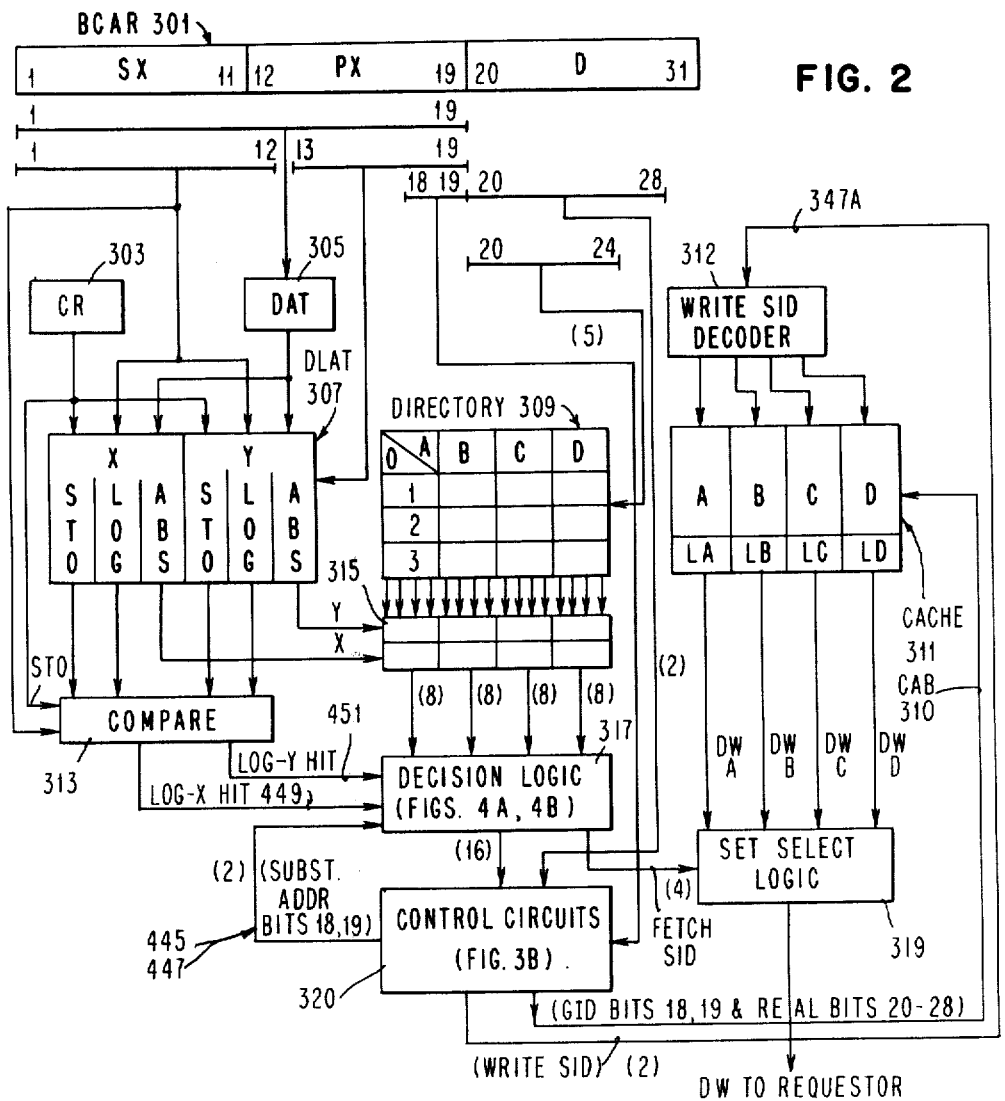
FIG. 2 shows, in a block diagram form, a cache addressing mechanism in which the present invention is implemented.

Referring now to FIG. 2, a cache addressing mechanism is explained which includes the present invention.

In FIG. 2, a set-associative cache system includes a cache 311, a cache directory 309 and a directory lookaside table (DLAT) 307. The directory 309 is an array which contains information about each line entry in the cache 311. The DLAT 307 is an array which contains the most recently translated page addresses used by processor 40. The cache directory 309 uses the well known concept of "set associativity" and is four-way set associative, which means that each addressable class in directory 309 contains four entries in sets A, B, C and D. Thus, when any class in the directory is addressed, four entries A, B, C and D are accessed in parallel. Directory 309 is addressed by bits 20 through 24 of a request logical address in a buffer control address register (BCAR) 301. Bits 20–24 address one class in each of $2^N$ groups of classes in directory 309, so that a total of $2^N$ classes are addressed simultaneously. Directory 309 is constructed to simultaneously select every location which can have the translated absolute address of the requesting logical address. When $2^N$ equals four in which N equals two virtual bits (which may comprise bits 18 and 19 of the requesting address in BCAR 301, four classes will be simultaneously addressed in directory 309. The four groups of classes in directory 309 are shown in FIG. 2 as groups 0, 1, 2 and 3. The directory address bits 18–24 in BCAR 301 define the principle class in directory 309. A principle group is defined as any of the $2^N$ groups found to contain a principle class.

Cache 311 may contain 64K bytes divided into the four sets A, B, C and D in which each set contains 2,048 doublewords (8 bytes). A doubleword is outputted in response to each fetch request when cache 311 is addressed by bits 18–28 from BCAR 301 after bits 18 and 19 are adjusted to any synonym hit location found in a synonym control circuit 320.

The DLAT 307 is two-way set associative with sets X and Y. A class in DLAT 307 is selected by bits 13–19 of the request in BCAR 301. Each DLAT set entry receives its content during an address translation, including: segment table origin (STO) bits from a control register (CR) 303 and bits 1–12 from BCAR 301 representing the logical address being translated, and the translated absolute address of the page having that logical address from a dynamic address translator (DAT) 305.

Each new address request in BCAR 301 is simultaneously used to address directory 309, cache 311, and DLAT 307. Thus, BCAR address bits 13–19 select a DLAT class with entries X and Y in DLAT 307. The STO, logical address in each X and Y entry is outputted to a comparator 313 and the absolute address of the X and Y entries is outputted to a comparator 315. A comparison is then performed in comparator 313 between the STO's and logical addresses in the two selected DLAT sets X and Y with the current STO in CR 303 and the logical request address in BCAR 301. If a match occurs, it is indicated by either a LOG-X HIT signal or LOG-Y HIT signal from comparator 313 on line 449 or line 451.

If no DLAT match occurs, the request is forced to start an address translation in DAT 305, after which the newly translated address is placed in an appropriate set in DLAT 307, and the storage access can then be started.

Simultaneously during a DLAT access and compare in circuit 313, the request is also causing an access in cache directory 309 using BCAR bits 20–24 to select a class in each group in cache directory 309. Then the directory accesses the absolute address in each of the four sets in each of the four selected directory classes and provides them to compare circuit 315, which compares each of these 16 absolute addresses with each of the two absolute addresses received from the selected X and Y entries in DLAT 307. Thus, each request causes 32 comparisons of absolute addresses in comparator 315, which are: X:A0, X:A1, X:A2, X:A3, X:B0, X:B1, X:B2, X:B3, X:C0, X:C1, X:C2, X:C3, X:D0, X:D1, X:D2, X:D3, Y:A0, Y:A1, Y:A2, Y:A3, Y:B0, Y:B1, Y:B2, Y:B3, Y:C0, Y:C1, Y:C2, Y:C3, Y:D0, Y:D1, Y:D2 and Y:D3.

Decision logic 317 receives 32 compare output lines from comparator 315, as well as outputs 449 and 451 from another comparator 313, to determine whether a principle or synonym directory hit has occurred or not. Comparator 313 activates one of its signals LOG-X hit or LOG-Y hit if the requesting logical address was found in the DLAT 307. The outputs of comparators 315 indicate if either DLAT absolute address was found in any of the four classes accessed in cache directory 309. If a DLAT logical address hit occurs, then circuits 317 will determine if a cache principle hit, cache synonym hit, or a cache miss occurs.

If a cache hit has occurred, circuits 320 output a cache group identifier (GID) which provides bits 18, 19 and combine them with request bits 20–28 in cache class address bus (CAB) 310 to select a class in cache 311, and circuit 317 or 320 respectively output a fetch or write set identifier (SID) to indicate which of the four sets of the cache 311 is to be selected for fetching or storing a doubleword.

For a write request, a write SID is provided on a line 347A to write SID decoder 312, which writes the request's doubleword (DW) into the selected location in cache 311. The write request's DW is written into the selected set of the selected class in the cache during the machine cycle after the directory and DLAT addressing cycle for the same request.

For a fetch request having a principle hit, the class selection in cache 311 by CAB 310 outputs a different doubleword (DW) to each of the four cache data latches LA, LB, LC and LD for each of the four sets A, B, C, and D in the selected cache class. Each latched DW is selected from the line in each of the four sets A, B, C and D. If a hit is detected, the fetch SID is applied to set select logic 319 to select and output the required DW in the selected cache class. The latched class of DW's in cache data latches LA, LB, LC and LD occurs at the end of the same machine cycle in which the request address is received by BCAR 301. During the next cycle, the set selected DW is outputted from set select logic 319.

The numbers in parenthesis next to some of the lines in the drawings represent the number of actual electrical lines represented by the illustrated line.

As the size increases for the cache 311 and its directory 309, either the number of classes or the degree of associativity must also be increased, or both, as discussed above. As mentioned previously, if the number of classes is enlarged, the cache addressing range must correspondingly be enlarged, which requires bits 18 and 19 from the translatable PX field in BCAR 301 in FIG. 2.

That is, the 31 bit logical address supplied to the BCAR 301 is architecturally organized as shown at the top of FIG. 2, in which an SX field (bits 1-11) is an index to a page table address in a segment table selected by the STO in CR 303, a PX field (bits 12-19) is an index to a page address in the selected page table; and a D field (bits 20-31) is a byte index in a 4 kilobyte page selected by the page entry. When the logical address is translated to an absolute address, bits 1-19 are changed by the translation process, but the D field bits 20-31 are not changed. Hence, the D field is sometimes called a real field in the logical address, and bits 1-19 are sometimes called a virtual field.

Each 31 bit address in BCAR 301 is presumed to address a byte in main storage 10. However, cache directory 309 is organized to address lines of 16 doublewords (DWs) located in main storage 10 on line boundaries. Hence, bits 1-24 in BCAR 301 address a required line, and bit 24 is the lowest-order bit for line addressing. If only the bits in the D field were used to address the cache directory, the maximum cache directory address field would be 20-24, which five bits could only address a maximum of 32 classes. If more classes are required, bits from the PX field must be used, e.g. bits 18 and 19 in FIG. 2. Then the seven bits 18-24 address a maximum of 128 classes. Since each class is 4-way associative, the seven bit addressing can access any of 128×4=512 lines in the cache. As previously described, the real address portion of the logical address ends with bit 20 for 4KB page addressing. Thus, bits 18 and 19 in the translatable part of the logical address may be called virtual bits. It is only when virtual bits provide part of the cache address that a synonym problem appears, as previously discussed.

Due to the use of the two virtual bits 18 and 19, a request for data or instructions in the cache 311 may reside in any of four possible classes. The cache class pointed to by the requesting logical address is called a principle class, while the other three classes obtainable by the other three permutations of the virtual address bits 18 and 19 in the cache directory address are called synonym classes.

Figure 3A:
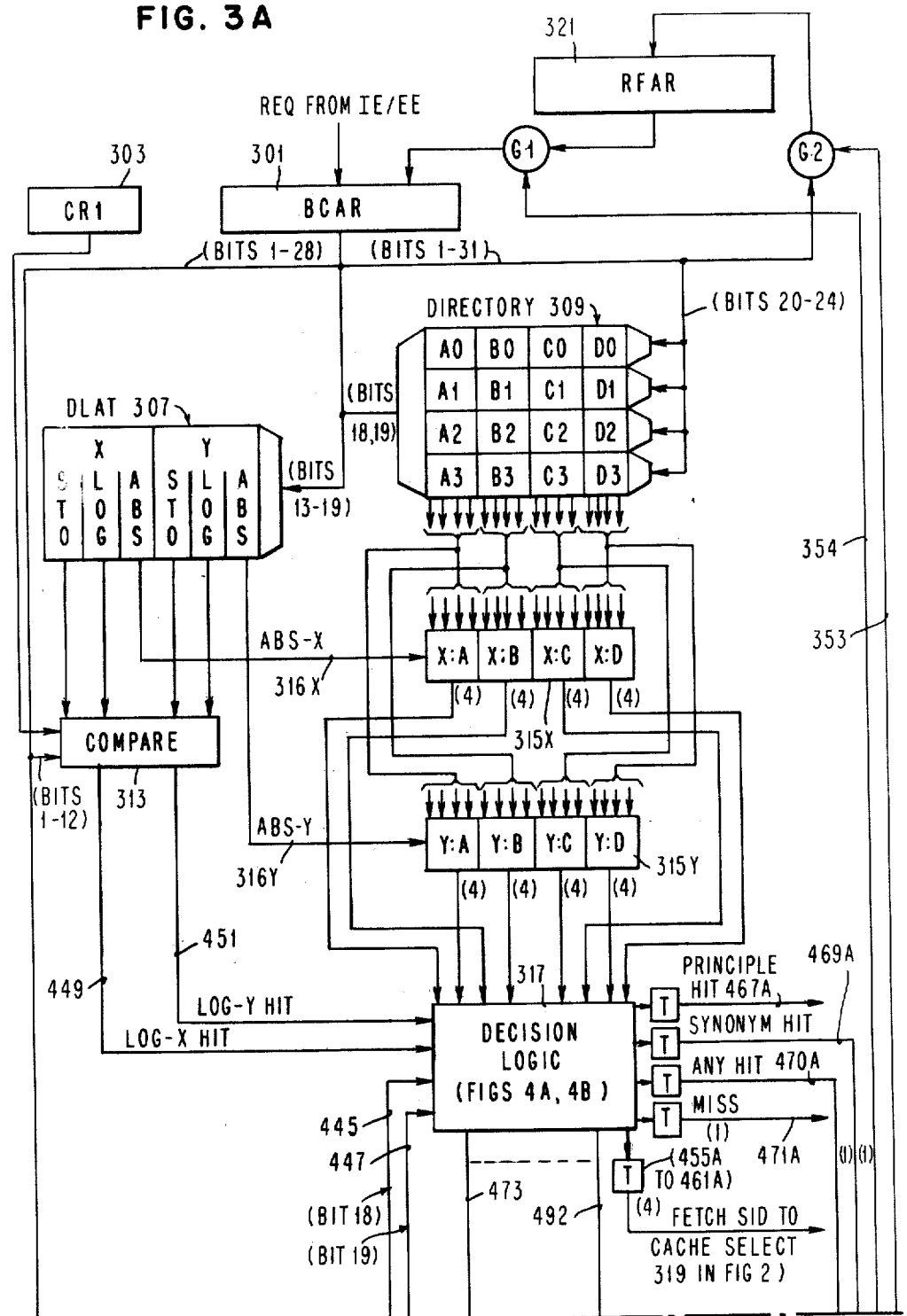
Figure 10A:
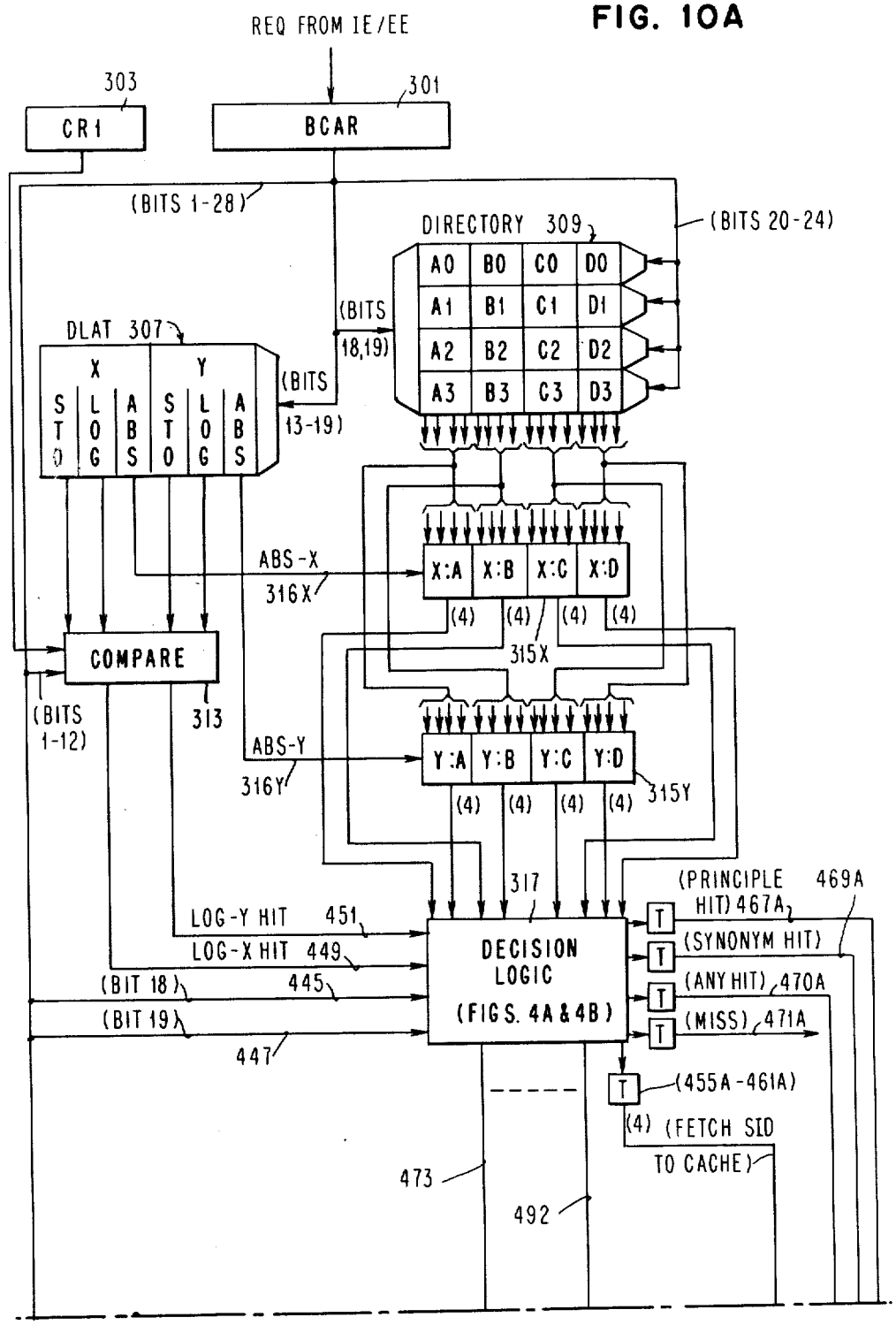

FIGS. 3, 3A and 3B show a more detailed representation of an embodiment of the synonym detection scheme discussed in relation to FIG. 2. In FIGS. 3A and 3B, the same reference numerals as those of FIG. 2 are used to designate corresponding elements. Another detailed embodiment is shown in FIGS. 10, 10A, and 10B. Both embodiments in FIGS. 3 and 10 detect a synonym in the second cycle of a fetch request. The embodiment in FIG. 3 thereafter handles the synonym fetch request in the same way as a principle hit, and takes five machine cycles for the request. The embodiment in FIG. 10 handles a synonym fetch request without processing it like a principle hit, and takes 3 machine cycles for processing a synonym fetch request. Both embodiments in FIGS. 3 and 10 use two machine cycles to access a principle fetch or store hit, or a synonym store hit, and can pipeline these requests in one cycle.

The following assumptions are made in both detailed embodiments: The cache (shown in FIG. 2) is a 64KB random access memory organized to contain 512 lines in which each set contains 128 lines. Directory 309 has four corresponding sets, and therefore is four-way set associative (sets A, B, C and D) as previously described in FIG. 2. Directory 309 also is organized with four groups of classes as previously described.

The DLAT 307 is two-way set associative (sets X and Y) as previously described in FIG. 2, with 128 classes each containing an X set and a Y set. DLAT 307 is addressed with logical address bits 13-19. Each of X and Y entries contains STO bits 5-19, logical address bits 1-12 to identify a virtual page, and absolute address bits 5-19 to identify the assigned page frame in main storage 10.

In operation, when a processor request is accepted, its associated address is loaded into the BCAR 301, from which the address part comprising bits 13-19 point to a class containing two entries X and Y in the DLAT 307 and the address part comprising bits 20-24 point to a class in each of four groups 0, 1, 2 and 3 in the cache directory 309 with each directory class containing four entires A, B, C, D. Each DLAT class entry can contain a STO and virtual address, each of which is received by the logical address compare circuit 313 which compares them with the logical address bits 1-12 from the BCAR 301 and STO bits 5-19 from the STO register 303. If a match occurs, the compare circuit 313 produces either a LOG-X HIT signal or a LOG-Y HIT signal to indicate a logical address DLAT hit occurred. Simultaneously with the operation of circuit 313, the absolute address bits 5-19 from each set X and Y of the DLAT 307 are being provided as two compare inputs to absolute address compare circuit 315, which is shown in FIG. 3A as a pair of compare circuits 315X and 315Y.

There are 32 comparators in both of the compare circuits 315X and 315Y, eight for four cache directory sets (A, B, C or D) in which each set has four X comparators and four Y comparators for comparing with the two DLAT entries X and Y in the selected DLAT class. Each of compare circuits 315X and 315Y also contains four group comparators. For example, directory set A provides four selected entries A0, A1, A2 and A3 through directory set D which provides four selected entries D0, D1, D2 and D3 from the cache directory 309. The comparator 315X compares the absolute addresses from these sixteen entries selected is directory 309 with the DLAT-X absolute address (ABS-X), and comparator 315Y corresponding compares the same sixteen directory addresses with DLAT Y absolute address (ABS-Y) for a total of 32 comparators in circuits 315. If a match occurs in any comparator of 315X or 315Y, it raises a corresponding one of the 32 output lines to decision logic 317 to indicate the cache group and set having the matching absolute address. The comparators of 315X and 315Y are constructed identically and function similarly.

Decision logic 317 receives all 32 outputs from the compare circuits 315X and 315Y, eight output lines per set; for example, it receives the following comparator outputs from set A: X:A0, X:A1, X:A2, X:A3, Y:A0, Y:A1, Y:A2 and Y:A3. Logic 317 also receives the LOG-X HIT and LOG-Y HIT outputs from the compare circuit 313. Logic 317 decides whether there is a synonym hit, a principle hit, or a miss. A principle hit is a hit in a selected class entry in the principal group, which is the group pointed to by the request address bits 18-19 in BCAR 301. A principle hit is signalled when a trigger is set by decision logic 317 to output a principle hit signal on line 467A on FIG. 3A. If the decision logic 317 finds a hit in a class entry other than in the principle group, i.e. in a group pointed to by other than the BCAR bits 18-19, a synonym hit is said to have occurred which is signalled by line 469A in FIG. 3A. Should no hit be detected, the decision logic 317 signals a miss on line 471A.

FIGS. 4A and 4B, which are to be arranged as shown in FIG. 4, show the internal details of decision logic 317 found in FIG. 3A. It comprises circuit blocks 400A, 400B, 400C and 400D for the sets A, B, C and D, respectively. Although only the circuit block 400A is shown in detail, it should be understood that the circuit blocks 400B, 400C and 400D are identically constructed and function similarly.

The circuit structure and the operation of circuit block 400A are explained below. Lines 429-435 and 437-443 receive the A:X and A:Y outputs, as follows: the X:A0, X:A1, X:A2, X:A3 and Y:A0, Y:A1, Y:A2, Y:A3 outputs, respectively, from the eight comparators for set A of circuits 315X and 315Y (FIG. 3A), respectively. Those lines are respective inputs to AND gates 403-417.

Input lines 445 and 447 provide to circuits 317: (1) the address bits 18 and 19 from the BCAR 301, or (2) substituted address bits 18 and 19, which are explained hereinafter with reference to FIG. 3B. The BCAR bits 18, 19 are normally provided via normally enabled AND gated 343 in FIG. 3B. The substituted bits 18, 19 are only provided after a synonym is detected, which deactivates gates 343 and activates a normally closed pair of gates 341 in FIG. 3B.

In FIG. 4A, the bits 18 and 19 received on the lines 445 and 447 are applied to a decoder 401 in decision logic 317 which activates one of four output lines that identify a particular group of classes; that is, the bit 18, 19 value "00" decodes into group 0, "01" decodes into group 1, "10" decodes into group 2, and "11" decodes into group 3. The group 0 output of the decoder 401 is applied to the other inputs of AND gates 403 and 411; the group 1 output to AND gates 405 and 413; the group 2 output to AND gates 407 and 415; and the group 3 output to AND gates 409 and 417.

During the first machine cycle for a request in BCAR 301, lines 445 and 447 will signal the principle group, because they will then represent the values of bits 18 and 19 in the request address.

The outputs from the AND gates 403-409 are dot-ORed and applied to one input of an AND gate 419A, while the outputs from the AND gates 411-417 are dot-ORed and applied to an input of an AND gate 419B. A two-port funnel 419 is comprised of the two AND gates 419A and 419B and an OR circuit 419C which ORs outputs of the AND gates 419A and 419B to provide the funnel (F) output.

Lines 449 and 451 receive any LOG-X HIT signal or LOG-Y HIT signal, respectively, from the compare circuit 313 (FIG. 3A) and convey them to a second input of AND gate 419A and AND gate 419B, respectively, in funnel 419. Only one of the lines 449 or 451 may be activated at one time. The output from funnel 419 indicates if there is a "principal class" hit in set A, because only the principle group signal is then being provided from decoder 401 to the gates 403-317 for set A.

There are also four other funnels F: 421, 423, 425 and 427 which are internally identical to funnel 419. Funnels 421, 423, 425 and 427 respectively detect any hit in groups 0, 1, 2 or 3 for set A, i.e. a "synonym class" hit or "principle class" hit in group 0 set A. Thus, the two compare lines 429 and 437 for group 0 set A from comparator 315 are connected to the two-port funnel 421 which also respectively receive DLAT lines 449 and 451.

Similarly, funnels 423, 425 and 427 receive the group 1 set A, group 2 set A, and group 3 set A pairs of compare signal lines from comparator 315, as well as the two lines carrying the LOG-X HIT and LOG-Y HIT signals. Thus, an output from any of funnels 421, 423, 425 or 427 indicates the respective group 0, 1, 2 or 3 in which there is a "synonym class" or "principle class" hit for set A, because they are selectively activated by the different pairs of group lines for set A from comparators 315X and 315Y.

Therefore circuit block 400A has one output line 455 which exclusively signals a set A "principle hit" and has four other output lines 473, 475, 477 and 479, which respectively signal any hit in set-A.

Similarly, each of circuit blocks 400B, 400C and 400D receive corresponding sets of eight compare signals from circuits 315X and 315Y for each of the sets B, C, and D, respectively, as well as the bit 18 and 19 signals from the decoder 401, and the LOG-X HIT and LOG-Y HIT signals from compare circuit 313. Like the circuit block 400A, each of circuit blocks 400B, 400C and 400D has one exclusive principle hit output line and four any hit lines for signalling any hit in the respective groups 0, 1, 2 or 3 for the respective sets.

The principle hit outputs from the blocks 400A, 400B, 400C, and 400D (lines 455, 457, 459 and 461, respectively) are outputted for use by the cache as a fetch set indicator (SID). They are also received by an OR circuit 453. The output from OR circuit 453 indicates a principle class hit in any cache set A, B, C, or D. The sixteen any hit output lines (four for each set) are received by a sixteen-way OR circuit 463, which has an output on line 470 that indicates if there is any cache hit (synonym or principle hit in any of the sets A, B, C, and D).

A decoder 465 receives the outputs of OR circuits 453 and 463 and provides the various hit and miss signals for the cache. The outputs from OR circuits 453 and 463 are decoded by the illustrated internal circuits in decoder 465 in accordance with the following rules:

| Principle Hit OR 453 | Any Hit OR 463 | Output of DECODER 465 |
|---|---|---|
| Yes | Yes | Principle Hit |
| No | Yes | Synonym Hit |
| No | No | Miss |
| Yes or No | Yes | Any Hit |
| Yes | No | Error Condition |

Thus, the principle hit output 467 from decoder 465 is activated directly by the output of OR circuit 453. The synonym hit output 469 from decoder 465 is activated by AND circuit 465A if the principle hit OR circuit 453 is not activated and the any hit OR circuit 463 is activated. A cache miss is signalled on line 471 if no any hit signal is provided from OR circuit 463. An error condition is indicated if the principle hit OR circuit 353 is activated while the any hit OR circuit 363 is not activated.

An encoder 327 receives all of the 16 any hit outputs 473–492 from the synonym decision logic 317.

FIG. 5 shows a detailed form of encoder 327. Encoder 327 receives the four sets of output lines 473–479, 481–484, 485–488 and 489–492 which indicate that there was a synonym/principle hit in any of the respective sets A, B, C and D. Only one of lines 473–492 can be active at any one time. A given request can have only one hit entry (principle or synonym) in the $2^N$ classes addressed by the request. If the line 473, for example, is activated, it indicates that there was a synonym or principle hit in the selected class in group 0, set A. Similarly, if the line 482 is activated, it indicates that there was a synonym or principle hit in the selected class in group 1, set B. Encoder 327 comprises four OR circuits which combine the respective set signals and provide them to a four-way SID encoder. Similarly, four other OR circuits combine the same signals into the four respective group signals and provide them to a four-way GID (Group Identifier) encoder. The two encoders output a hit's set identifier (SID) and group identifier (GID) in accordance with the following rules:

| HIT | SID | HIT | GID |
|---|---|---|---|
| A | 00 | 0 | 00 |
| B | 01 | 1 | 01 |
| C | 10 | 2 | 10 |
| D | 11 | 3 | 11 |

In FIG. 3, the encoded two bits for the write SID are used only by a store request to select the one of four sets into which a double word will be written into the cache. The encoded two bits for the GID are provided to the cache 311 in FIG. 2 to select the group in which a fetch or store access is being made.

Since the cache operations to main storage resulting from a principle hit or a miss are conventional, they are not discussed further herein.

The present invention is directed to a special course of action taken when a synonym hit is detected for a cache access.

In FIG. 3A, when a fetch request results in a synonym hit being detected by decision logic 317, it activates the synonym hit line 469 which on the next machine cycle sets an output trigger 469A, and the set signal from the trigger 469A is applied to an AND gate 355 in FIG. 3B, which also receives another input 356 indicating the fetch request. An output from AND gate 355 sets a trigger 329. Then the set output from trigger 329 through an inverter 333 to line 353 serves to close a normally open gate G2 in FIG. 3A to inhibit the loading of a new address from the BCAR 301 to a re-do fetch address register (RFAR) 321. Normally, the RFAR 321 is loaded with the fetch address in BCAR 301 through normally-open gate G2 upon the cycle following the loading of BCAR 301. The RFAR 321 is used as a delay register when a fetch request has a synonym hit. The set output of trigger 329 acts as a RFAR request to a BCAR priority circuit 335, which determines which of plural possible requestors to BCAR 301 will be allowed to load BCAR 301. An RFAR request has relatively high priority and therefore is likely to get the BCAR on the next cycle, so that the synonym fetch hit can thereafter be handled like it is a principle hit. The priorities of the requestors for BCAR have the following order:

1. A line fetch request to update the directory 309 and input data to cache 311.
2. A cast out request from the cache.
3. RFAR 321 request.
4. A cross-interrogation request.
5. A DAT request for a table fetch while performing a translation.
6. An invalidate register used to hold store requests being made by I/O.
7. IE (processor) requests for normal fetches and stores.

If the BCAR priority circuit 335 gives priority to an RFAR request, it sets a RFAR accept trigger 337. At the same time, an output 354 from the BCAR priority circuit 335 is applied to open a normally closed gate G1 in FIG. 3A to transfer the content of RFAR 321 back into BCAR 301. At the same time an RFAR priority output from circuit 335 sets an RFAR accept trigger 337, which activates a pair of AND gates 341 and via inverter 339 deactivates AND gates 343. The substitute bits 18, 19 are provided through gates 341. The output from RFAR accept trigger 337 is also applied to the reset input of the trigger 329 to reset it to its normal state, which causes inverter circuit 339 to activate AND gates 343 to pass the bits 18-19 from BCAR 301 through OR circuits 345A and B to the decision logic 317.

In FIG. 3B, the two-bit SID and the two-bit GID from the encoder 327 are registered in a register 347; and the GID bits in the register 347 are then transferred to a register 351 through a normally open gate G3 which is opened by the reset state of trigger 329 via inverter 333. The GID in register 351 is then sent as substitute bits 18, 19 to decision logic 317 via the pair of AND gates 341, so that the substitute bits 18, 19 are thereafter used in the decision logic 317 in place of the bits 18–19 from the BCAR 301 when a synonym hit is detected. The substitution is used during the RFAR accept trigger cycle by the decision logic 317 when the synonym request is made to appear like a principle hit, because the substituted bits 18, 19 cause one of the principle hit funnels 419 to be activated (see FIG. 4A)

which activates principle hit output 467. During the cycle having the output from the RFAR accept trigger 337 on line 338, it also activates a gate G6 to transfer the GID from register 351 through a group select OR circuit 359 to the cache class address bus (CAB) 310 shown in FIG. 2. At the same time, a DW select circuit 363 simultaneously transfers bits 20-28 received through gate G8 from the BCAR 301 to the CAB 310 to complete the cache address of the required DW. Gate G8 is activated as long as no store request is received. Cache 311 then selects the requested DW. When line 338 is activated, it closes a gate G7 to prevent the transfer of the BCAR bits 18-19 to register 359 by dropping the output of an inverter 381 to an AND circuit 382 which controls gate G7. Thus, gate G7 only operates for a principle hit to cause BCAR bits 18-19 to be gated out of group select circuit 359 to CAB 310.

For a store request, select circuit 363 receives bits 20-28 from a push-down store address register (PDSAR) 361, which holds store request address bits 20-28 during the cycle after the request is received from BCAR 301, which is when the store operation is completed. The SID bits and bits 18, 19 are provided differently for a store request than for any fetch request. The store SID is provided directly from the SID register 347 to the cache to address the cache set to be stored in. Bits 18, 19 for the store request are timed by AND gate 357 receiving the store request signal and an any hit signal on line 470A. The output of gate 357 activates a gate G4 to pass the GID from register 347 through the group select OR circuit 359 to CAB 310 at the same time circuit 363 is providing bits 20-28 from PDSAR 361A via gate G5.

If a fetch operation detects a principle hit, BCAR bits 18-19 pass through a normally open gate G7 to group select circuit 359, and BCAR bits 20-28 pass through normally open gate G8 and DW select circuit 363. Thus, the BCAR bits 18-28 are supplied to the cache to address it with the fetch SID from logic 317.

A cache access by any store hit (whether principle or synonym) will write data into cache 311 on the cycle (C2) after BCAR 301 receives the request (on cycle 1). A cache access by a principle fetch hit supplies the requested data from the cache on the machine cycle after BCAR 301 receives the request. A cache access by a synonym fetch hit supplies data on the fourth machine cycle after BCAR 301 receives the request (on cycle C1), because the synonym fetch request is temporarily stored in the RFAR so that higher priority requests can intervene and use BCAR due to the operation of the BCAR priority circuit 335.

FIG. 6A shows a timing chart for the fetch operation when a synonym hit is detected. In a R cycle, a fetch request is brought up. The DLAT and directory comparisons are made in a C1 cycle, at the end of which a snyonym hit is detected. In the following C2/DLY cycle, a fetch delayed signal is sent to the IE so that any cache data provided in this cycle is not associated with the request in the R cycle. The RFAR 321 is loaded from BCAR and indicated to be busy. In the next DLY cycle, an RFAR request for BCAR priority is made by RFAR 321. (See BCAR PRIO 335 in FIG. 3B.) If the RFAR request is honored in the DLY cycle, the IE is given an advance signal. In the next C1 cycle, substitute bits 18-19 are provided by GID circuit 351 to the synonym decision logic 317 which activates its principle hit output 467. Now the synonym hit looks like a principle hit and is thereafter handled in the same way as a principle hit. In the following C2 cycle, cache data is transferred to the requestor (e.g. the IE).

FIG. 6B illustrates the timing for a store operation which always takes place on the cycle after the directory compare.

Figure 8:
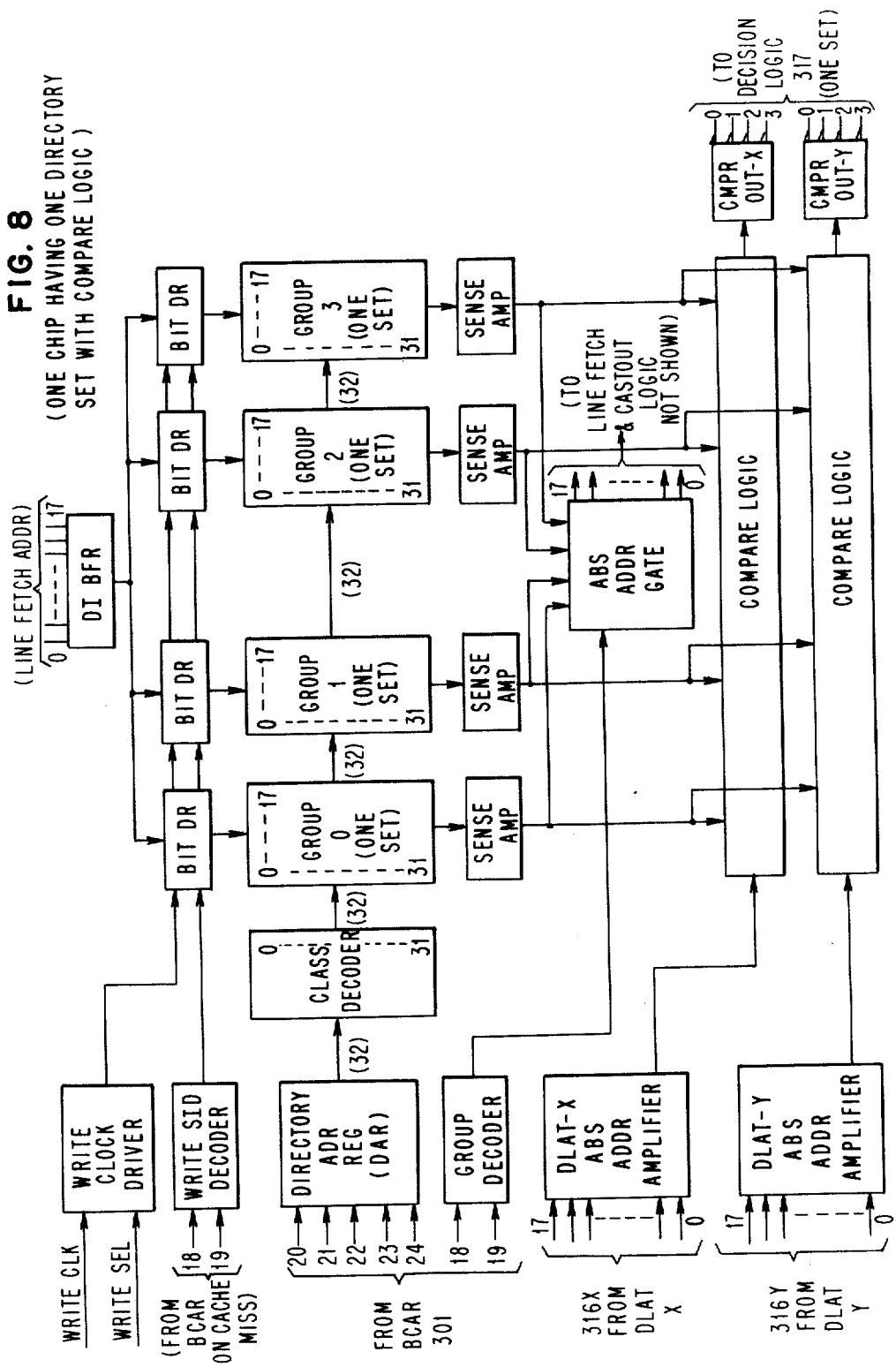
FIG. 8 illustrates a single chip in the cache directory providing circuitry for one directory set with four groups of classes and compare logic.

FIG. 7 illustrates a structure for a four-way set-associative cache directory, which uses the novel LSI chip structure shown in FIG. 8 that includes the novel groups with comparators provided on the same chip. FIG. 7 shows four chips A, B, C and D for the respective sets, each chip being an identical LSI chip having the novel group structure shown in FIG. 8. Thus, BCAR real address bits 20-24 simultaneously select four directory classes respectively from the groups 0, 1, 2 and 3 on all chips, and they are all simultaneously compared in the compare logic on the chips with the received ABS-X and ABS-Y DLAT outputs. The 32 compare results X:A0 through Y-D4 provide the 32 outputs (8 from each set) which are connected as line inputs to synonym decision logic 317.

The DLAT 307 and DLAT compare 313 may also be structured from six chips of the type shown in FIG. 8, in which three chips provide the X set and its compare logic and three other chips provide the Y set and its compare logic.

The architecture for a computer system may require that the cache directory not contain an address more than once. Also each directory address may be a main storage line address, e.g. for a line of 128 bytes. Such architecture would require than a main storage address be represented in either a principle entry or a synonym entry, but not in both at the same time. Such architecture may be enforced by having a checking circuit (not shown) check the output lines 473-479, 481-484, 485-488 and 489-492 in the embodiment to issue an error signal whenever more than one of these sixteen lines is active at any one time.

FIGS. 10, 10A, and 10B show a second embodiment of the subject invention which takes less machine cycles to perform a synonym fetch than in FIG. 3 and also results in some simplification of circuitry. That is, FIGS. 10, 10A, 10B can perform a synonym fetch in three cycles versus five cycles for FIGS. 3, 3A and 3B. The latter can use a simpler interface between the cache and processor because it makes a synonym fetch appear to the processor as a delayed principle fetch. On the other hand, FIGS. 10, 10A and 10B require a cache to processor interface which can recognize a synonym fetch cycle.

Both embodiments in FIGS. 3 and 10 take two cycles for a synonym store operation and for a principle fetch or store operation.

FIG. 10A is the same as FIG. 3A except that FIG. 10A does not have RFAR 321 or its gates G1 and G2. Also bits 18, 19 to decision logic 317 are only provided by BCAR 301; that is, there are no substitute bit 18, 19 to logic 317 in FIG. 10A.

FIG. 10B has substantial changes from FIG. 3B. FIG. 10B does not have any BCAR priority control, which is provided by circuits 329, 335 and 337 in FIG. 3B. Also, FIG. 10B does not have the bit 18, 19 substitution circuits 339, 341, 343 and 345 found in FIG. 3B.

Another difference is that PDAR (push down address register) 361A in FIG. 10B receives both fetch and store request addresses from BCAR 301, while PDSAR 361 in FIG. 3B receives only store request addresses.

Also only FIG. 10B has fetch SID circuits 371 (shown in detail in FIG. 11), which provide the SID for both principle and synonym fetches to cache select logic 319 in FIG. 2. Thus, in FIG. 4A, the fetch SID output from lines 455–461 is not connected to logic 319 for the embodiment in FIG. 10.

Figures 9, 11:
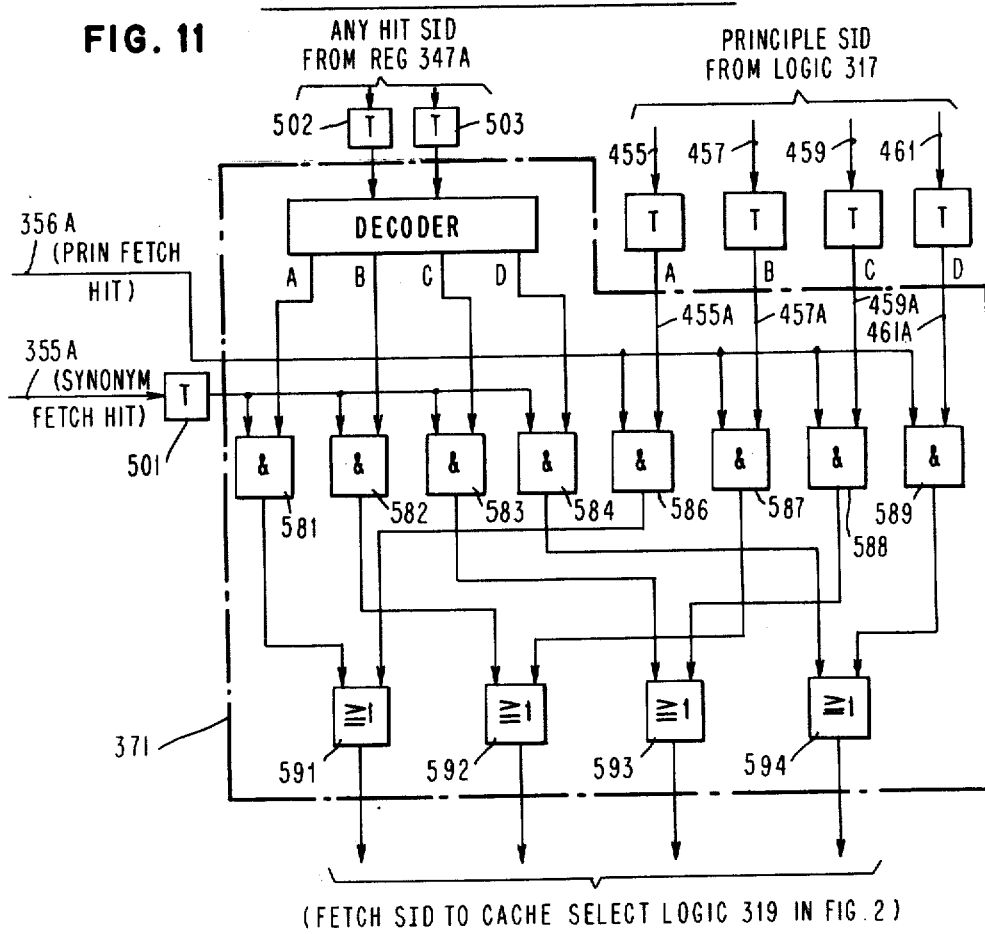
FIG. 9 illustrates the machine cycle timing for a synonym fetch operation in a second embodiment shown in FIG. 10.
FIG. 11 shows the circuit details for fetch SID circuits 371 found in the second embodiment.

FIG. 9 shows the timing for the three cycle synonym fetch hit operation of the embodiment in FIGS. 10A and 10B. The principle fetch hit and principle or synonym store hit each operate in two cycles and provide their output during the C2 cycle.

Since only BCAR 301 supplies address bits 18, 19 to all four funnels 419 in decision logic 317, only the principle fetch SID can be provided on output lines 455, 457, 459 and 461 from logic 317. The principle SID is delayed by one machine cycle in triggers 455A, 457A, 459A and 461A at the output of logic 317 from which the fetch SID is provided to circuit 371 (shown in detail in FIG. 11) during the C2 cycle in FIG. 9. In FIG. 11, a principle SID passes through AND gates 586–589 which are enabled and through OR circuits 591–594 to cache set select logic 319 in FIG. 2 during the C2 cycle. Gates 586–589 are enabled by a signal on a line 356A which is activated in FIG. 10B by enablement of AND gate 356 by a fetch request signal and a principle hit signal on line 467A from decision logic 317. Hence, the DW for a principle hit is outputted from circuit 319 on the C2 machine cycle after the request is outputted by BCAR 301 during cycle C1.

A synonym fetch SID is outputted from circuit 371 during the C3 cycle in FIG. 9 when a synonym fetch signal is provided from an AND gate 355 during the C2 cycle. Gate 355 is activated during a fetch request by a synonym hit signal on line 469A from decision logic 317 during the C2 cycle. In FIG. 11, the signal on line 355A is delayed during the C2 cycle by a trigger 501, which on the C3 cycle enables AND gates 581–584 to pass the decoded SID than being outputted from triggers 502 and 503 which receive the two lines 347A from register 347. The SID is then provided through OR circuits 591–594 to cache select logic 319.

The synonym fetch signal on line 355A also during the C2 cycle passes through an OR circuit 358 to activate gate G4 to pass the GID from register 347 through group select OR circuit 359 to provide bits 18, 19 to the cache CAB 310 in FIG. 2.

Also during the C2 cycle, the output of OR circuit 358 causes bits 20–28 in PDAR (push down address register) 361A to be gated by G5 through DW select OR circuit 363 to the cache CAB 310 in FIG. 2 to complete the cache address. The PDAR always contains the value which was in BCAR 301 during the prior C1 machine cycle. Inverter 383 during the C2 cycle inhibits both gates G7 and G8 to prevent any bits currently in BCAR 301 from then being received by select OR circuits 359 or 363, so that the BCAR content cannot interfere with the synonym fetch cache address being provided.

In summary, the SID and GID signals are held during the C2 machine cycle in register 347. Also the SID is held for the C3 cycle in circuits 371 when they provide the SID to the set select logic 319. The doubleword accessed from the cache is then provided to the requestor, e.g. IE/EE, from the output of logic 319 during the C3 cycle.

Any store request hit activates AND gate 357 which also activates the output of OR circuit 358 to enable gates G4 and G5 to pass the GID from register 347 and the PDAR bits 20–28 from circuit 359 to CAB 310 during a C2 cycle. Also during the C2 cycle, the SID from register 347 is passed to the write SID decoder 312 in FIG. 2 to write the doubleword of data provided by the requestor into the proper set in cache 311 to complete the store request.

While the present invention has been shown and described with reference to preferred embodiments which use a four-way set associative cache, with four groups of classes, it should be understood that any $2^N$ number of groups may be used and any degree of set associativity may be used including no set associativity Although the invention as been shown and described with reference to plural embodiments thereof, it should be understood by those skilled in the art that various changes and omissions in the form and details of the invention may be made therein without departing from the spirit and the scope of the invention, which is to be limited only as set forth in the following claims.

Having thus described our invention, what we claim as new, and desire to secure by Letters Patent is:

1. In a cache addressing mechanism including a cache, a cache directory having a plurality of congruence classes, each class having one or more entries, each entry capable of containing an address field representing a main storage address corresponding to a subgroup of data in said cache, a request address register for receiving a logical address provided as a request address for a main storage access, the request address including both a translatable field and a non-translatable field; a cache directory address obtained from the request address register including a low-order part of the translatable field and a high-order part of the non-translatable field; a dynamic lookaside address translation buffer (DLAT) for containing logical to main storage address translations of a plurality of recent processor request addresses, the request address selecting a DLAT class which outputs a DLAT entry containing a logical address and a translated main storage address; the cache organization comprising:

means for concurrently selecting a directory class in each of $2^N$ groups of classes in the cache directory by addressing each group with the high-order part of the non-translatable field, N being the number of bit positions in the low-order part of the translatable field in the cache directory address, means for reading out one class in each of the $2^N$ groups being addressed by the concurrent selecting means, wherein $2^N$ classes of directory entries are read out, main storage address compare means for comparing each read out directory entry with each main storage address being outputted from the DLAT, logical address compare means for comparing the request address with each logical address being outputted from the DLAT, hit detection means receiving the outputs of the main storage compare means and the logical address compare means to provide an any hit signal when the logical address compare means finds the request address is the same as the DLAT outputted logical address and the main storage address compare means finds any outputted directory entry which is the same as the DLAT outputted main storage address, group control means connected with the hit detection means for providing a group identifier representing the group providing the any hit signal, cache address generation means connected with the group control means for combining the group identifier and a high-order part of the non-translatable field to address data in a subgroup in the cache, whereby the addressed data in the cache is data requested by the request address, whether the found directory entry is in a principle class or in a synonym class.

2. A cache organization as defined in claim 1, the hit detection means further comprising:

principle/synonym detection means for signalling a synonym hit when the group identifier is not equal to the N low-order bit positions in the translatable field and for signalling a principle hit when the group identifier is equal to the N low-order bit positions.

3. A cache organization as defined in claim 2, also having cache data accessing means comprising:

direct cache addressing means for accessing the cache with a cache address derived from the request address comprising the N low-order bit positions of the translatable field and the high-order bit positions of the non-translatable field when the principle/synonym detection means signals a principle hit, and means for substituting the group identifier provided from the group control means for the N low-order bit positions of the translatable field in the cache address being provided by the direct cache addressing means when the principle/synonym detection means signals a synonym hit, whereby accessed data in the cache may be in either a principle class or any synonym class for any request.

4. A cache organization as defined in claims 1, 2 or 3, in which the cache directory and cache are set-associative, each directory class containing a plurality of set-associative entries.

5. A cache organization as defined in claim 4, in which each entry in each class in the cache directory represents the address of a line of double words in main storage on a line boundary.

6. In a cache addressing mechanism including a cache, a cache directory having a plurality of congruence classes, each class having one or more entries, each entry capable of containing an address field representing a main storage address corresponding to a subgroup of data in said cache, a request address register for receiving a logical address provided as a request address for a main storage access; the request address including both a translatable field and a non-translatable field; a cache directory address obtained from the request address register including a low-order part of the translatable field and a high-order part of the non-translatable field; a dynamic lookaside address translation buffer (DLAT) for containing logical to main storage address translations of a plurality of recent processor request addresses, the request address selecting a DLAT class which outputs a DLAT entry containing a logical address and a translated main storage address; the cache organization comprising:

high-speed array circuits organized into a cache directory with a plurality of rows divided into groups of rows in which each row contains an addressable class, a plurality of group addressing means connected to the array circuits for respectively addressing the different groups in the cache directory, the high-order part of the non-translatable field in the request address register being connected to an input of each group addressing means to simultaneously address one class in each of the groups, there being one or more directory entries in each class, each entry being capable of containing a subgroup address representing a subgroup of data in the cache, each directory entry indicating its content as valid or non-valid, main storage address compare means for comparing a valid content in each entry being addressed by the plurality of group addressing means and each main storage address being outputted from the DLAT, logical address compare means for comparing the request address with each logical address outputted from the DLAT, an any hit signal being provided when both compare means a compare-equal output, whereby the compare means can simultaneously perform comparisons for all principle and synonym directory entries being addressed in the cache directory.

7. A cache organization as defined in claim 6, the cache directory comprising:

at least one LSI chip for each unit of set associativity in the cache directory, each LSI chip formed with the plurality of groups of addressable classes.

8. A cache organization as defined in claim 7, each LSI chip comprising:

a comparator structure one each LSI chip including at least a part of the compare means for entries addressed on the same chip.

9. A cache organization as defined in claim 6, further comprising:

the plurality of groups comprising $2^N$ groups, N being the number of bit positions in the low-order part of the translatable field in the cache directory address, decision logic means having a principle group decoder and having a gating group for respective entry locations called sets in the directory array, the decoder receiving the N bit positions of the cache directory address and providing $2^N$ decoder outputs, each gating group having a principle hit gating means receiving the $2^N$ decoder outputs and all compare outputs for a respective set from the compare means as well as receiving each outputted address from the DLAT, the output of the principle hit gating means indicating if a principle hit exists, each gating group also having $2^N$ group hit detecting means, each group hit detecting means receiving the compare outputs for the respective set and receiving each outputted address from the DLAT, the output of each group hit detecting means indicating if a hit exists in the respective group in the set, any hit detecting means ORing the outputs of all group hit detecting means to indicate any hit in the cache directory, principle hit detecting means ORing the outputs of all principle hit gating means to indicate if a principle hit exists in any set, synonym decoding means ANDing the outputs of the any hit detecting means and an inverted output of the principle hit detecting means to indicate if a synonym hit exists in the directory array.

10. A cache organization as defined in claim 9, the decision logic means further comprising:
hit determination means receiving the compare outputs from the directory array and receiving a DLAT found signal for each set, each DLAT found signal indicating that the request had an address translation found in the DLAT, the hit determination means having a first plurality of gates receiving the compare outputs and the DLAT found signal, a cache hit activating a gate in the first plurality,
a principle decoder receiving low-order bit positions from the translatable field of the request address, the hit determination means having a second plurality of gates respectively and the compare outputs and the DLAT found signals, a principle hit activating a gate in the second plurality,
synonym hit detection means comprising first OR circuitry receiving the outputs of the first plurality of gates for indicating any cache hit, and second OR circuitry receiving the outputs of the second plurality of gates for indicating a principle hit, decoding circuitry receiving outputs from the first and second OR circuitry to indicate a synonym hit when the first OR circuitry provides an output and no output is being provided by the second OR circuitry.

11. A cache organization as defined in claim 9, further comprising:
a group indentifier (GID) control means having $2^N$ number of OR circuits, each OR circuit receiving the outputs of all of the group hit detecting means for a respective group, the output of the group identifier control means generating a group identifier signal for each group.

12. A cache organization as defined in claim 11, further comprising:
group identifier (GID) encoder means receiving the outputs for each group from the group identifier control means and encoding the group into a combinatorial GID signal.

13. A cache organization as defined in claim 12, further comprising:
a set identifier (SID) control means having K number of OR circuits, each OR circuit receiving the outputs of all of the group hit detecting means for a respective set, the output of the set identifier control means generating an any hit set identifier signal for each set.

14. A cache organization as defined in claim 13, further comprising:
set identifier (SID) encoder means receiving the any hit SID outputs for all sets from each set identifier control means and encoding the sets into a combinatorial any hit SID signal.

15. A cache organization in claim 14, further comprising:
a push down store address register (PDSAR) receiving real address bits from the request register during a next cycle after a store request cycle,
a data real addressing circuit for providing the real addressing bits of the cache address in the PDSAR to select data in the required class in the cache,
real bit gating means enabled by a store request hit signal for transferring the real addressing bits from the PDSAR to the data real addressing circuit,
whereby requestor data may be stored in the cache at a synonym location on the second cycle after a request is received.

16. A cache organization as defined in claim 12, further comprising:
a group select OR circuit for providing the high-order bits of the cache address to select a required class in the cache,
GID gating means enabled by a synonym hit signal from the synonym hit detection means to connect the GID signal from the GID encoder means to the group select OR circuit.

17. A cache organization as defined in claim 16, further comprising:
real bit gating means enabled by a synonym hit signal from the synonym hit detection means for transferring bits from the non-translatable field of the request to the data real addressing circuit,
a data real addressing circuit for providing low-order bits for the cache address to select data in the required class in the cache.

18. A cache organization as defined in claim 17, further comprising:
a redo fetch address register (RFAR) receiving a request address on a next cycle after the request is received by the request address register,
a RFAR request trigger being set by a synonym hit signal from the synonym hit detection means during a fetch request,
a request priority circuit receiving requests for inputs to the request address register including the set output from the RFAR request trigger to select the next requesting input allowed to the request address register,
substitute gating means for transferring the output of the GID encoder means to the principle group decoder in the decision logic means in response to an RFAR acceptance by the request priority circuit,
whereby the decision logic means signals a principle hit in response to the substitute gating means transferring a GID signal caused by a synonym fetch request.

19. A cache organization as defined in claim 18, further comprising:
means for indicating whether the request address is for a store access or a fetch access in the cache,
the real bit gating means being enabled as long as no store access is signalled by the indicating means when a principle hit signal is provided,
whereby the cache is addressed by the substitute bit gating means and the real bit gating means to provide synonym data to a requestor during a principle type cycle after a synonym fetch hit is detected.

20. A cache organization as defined in claim 17, further comprising:
a push down address register (PDAR) receiving real address bits from the request register during a next cycle after a request cycle,
the real bit gating means being enabled by a synonym hit signal on the next cycle,
whereby requestor data is stored in the cache at a synonym location on the second cycle after a request is received.

* * * * *